(12) United States Patent
Ribarich

(10) Patent No.: US 8,164,272 B2
(45) Date of Patent: Apr. 24, 2012

(54) 8-PIN PFC AND BALLAST CONTROL IC

(75) Inventor: Thomas J. Ribarich, Laguna Beach, CA (US)

(73) Assignee: International Rectifier Corporation, El Segundo, CA (US)

( * ) Notice: Subject to any disclaimer, the term of this patent is extended or adjusted under 35 U.S.C. 154(b) by 584 days.

(21) Appl. No.: 11/548,807

(22) Filed: Oct. 12, 2006

(65) Prior Publication Data
US 2007/0108915 A1    May 17, 2007

Related U.S. Application Data

(60) Provisional application No. 60/661,809, filed on Mar. 15, 2005, provisional application No. 60/725,706, filed on Oct. 12, 2005.

(51) Int. Cl.
*G05F 1/00* (2006.01)
(52) U.S. Cl. ........ 315/291; 315/309; 315/247; 315/224; 315/209 R
(58) Field of Classification Search .............. 315/291, 315/297, 307–311, 224, 225, 209 R, 247, 315/246
See application file for complete search history.

(56) References Cited

U.S. PATENT DOCUMENTS

| 5,315,214 | A | 5/1994 | Lesea |
| 5,539,338 | A | 7/1996 | Moreland |
| 5,545,955 | A | 8/1996 | Wood |
| 5,936,423 | A | 8/1999 | Sakuma et al. |
| 5,999,421 | A | 12/1999 | Liu |
| 6,211,623 | B1 | 4/2001 | Wilhelm et al. |
| 6,259,614 | B1 | 7/2001 | Ribarich et al. |
| 6,285,138 | B1 * | 9/2001 | Kataoka et al. ............... 315/291 |
| 6,617,805 | B2 | 9/2003 | Ribarich et al. |
| 7,154,232 | B2 | 12/2006 | Contenti et al. |
| 7,301,288 | B2 * | 11/2007 | Green ........................... 315/291 |
| 2002/0047635 | A1 | 4/2002 | Ribarich et al. |
| 2004/0223277 | A1 * | 11/2004 | Cheng et al. ................. 361/100 |
| 2005/0184685 | A1 | 8/2005 | Sekine et al. |
| 2005/0218824 | A1 * | 10/2005 | Busse ........................ 315/200 R |
| 2007/0052373 | A1 * | 3/2007 | Hui et al. ....................... 315/291 |

FOREIGN PATENT DOCUMENTS

FR    2 632 110    12/1989

OTHER PUBLICATIONS

Fairchild Semiconductor Corporation: "KA7541 Simple Ballast Controller" Fairchildsemi.com, 2001, pp. 1-14.
Office Action issued Jul. 26, 2007 in corresponding Korean Application No. 99542/2006 with English language translation.
European Search Report issued Oct. 16, 2007.
Adaptive Ballast Control IC, www.irf.com, Data Sheet No. PD60212 revC, pp. 1-17 (2005).
Ribarich, T.J., "A New Power Factor Correction and Ballast Control IC", IEEE, pp. 504-509, (2001).

* cited by examiner

*Primary Examiner* — Tuyet Thi Vo
(74) *Attorney, Agent, or Firm* — Farjami & Farjami LLP

(57) ABSTRACT

The present invention relates to a fluorescent ballast control integrated circuit (IC) with power factor correction (PFC), and more particularly to a ballast control IC with a low pin count and improved programmability. The invention relates further to control methods performed by the IC.

26 Claims, 4 Drawing Sheets

8-PIN PFC AND BALLAST CONTROL IC

CROSS REFERENCE TO RELATED APPLICATIONS

This application is based upon and claims priority of U.S. Provisional Ser. No. 60/661,809 filed Mar. 15, 2005 and U.S. Provisional Ser. No. 60/725,706 filed Oct. 12, 2005, incorporated by reference.

BACKGROUND OF THE INVENTION

The present invention relates to a fluorescent ballast control integrated circuit (IC) with power factor correction (PFC), and more particularly to a ballast control IC with a low pin count and improved programmability. The invention relates further to control methods performed by the IC.

SUMMARY OF THE INVENTION

Ballast control IC's of background interest are described in U.S. Pat. Nos. 5,545,955; 6,211,623; 6,259,614; 6,617,805; and U.S. application Ser. No. 10/875,474 (allowed), all incorporated by reference.

The present invention provides a PFC, ballast control and half-bridge driver in one IC. Other features include:
  Critical-conduction mode boost-type PFC
  Internal VBUS sensing and regulation
  Internal PFC over-current protection
  Internal PFC zero-crossing detection
  Internal PFC loop compensation
  Adaptive saturation ignition regulation
  Internal non-ZVS protection
  Programmable preheat time
  Programmable preheat frequency
  Programmable run frequency
  Latched negative-going threshold on VCC
  Fixed dead-time (1.5 us typ.)
  DC bus under-voltage reset
  Lamp insert auto-restart
  Up/down fault counter
  Internal bootstrap MOSFET
  Internal 15.6V zener clamp diode on Vcc
  Micropower startup (200 µA)
  Latch immunity and ESD protection The disclosed IC and method includes high-voltage sensing circuits to perform various PFC and ballast system functions. A single high-voltage pin senses PFC zero crossing and over-current. A second high-voltage pin senses the DC bus voltage and the half-bridge current. Programmable ballast parameters include pre-heat time, preheat frequency and run frequency. Protection features include ignition regulation, lamp non-strike protection, open filaments, end-of-life, lamp removal and automatic restrike. Combining these high-voltage control techniques together with programmable ballast parameters and complete fault protection in a single 8-pin IC results in a massive reduction in component count, an increase in manufacturability, and greater reliability, while maintaining high ballast system performance.

The benefits of the disclosed IC and method include:
  No PFC secondary winding required
  No PFC current-sensing resistor required
  No PFC compensation capacitor required
  No Half-bridge current-sensing resistor required
  No VBUS voltage sensing resistor network required
  No external bootstrap diode required
  Small 8-pin package
  Massive reduction in component count
  Increased manufacturability and reliability
  Fast design time Other features and advantages of the present invention will become apparent from the following description of embodiments of the invention which refers to the accompanying drawings.

DETAILED DESCRIPTION OF AN EMBODIMENT OF THE INVENTION

Functional Description: Ballast Control Circuit

Figure 3:
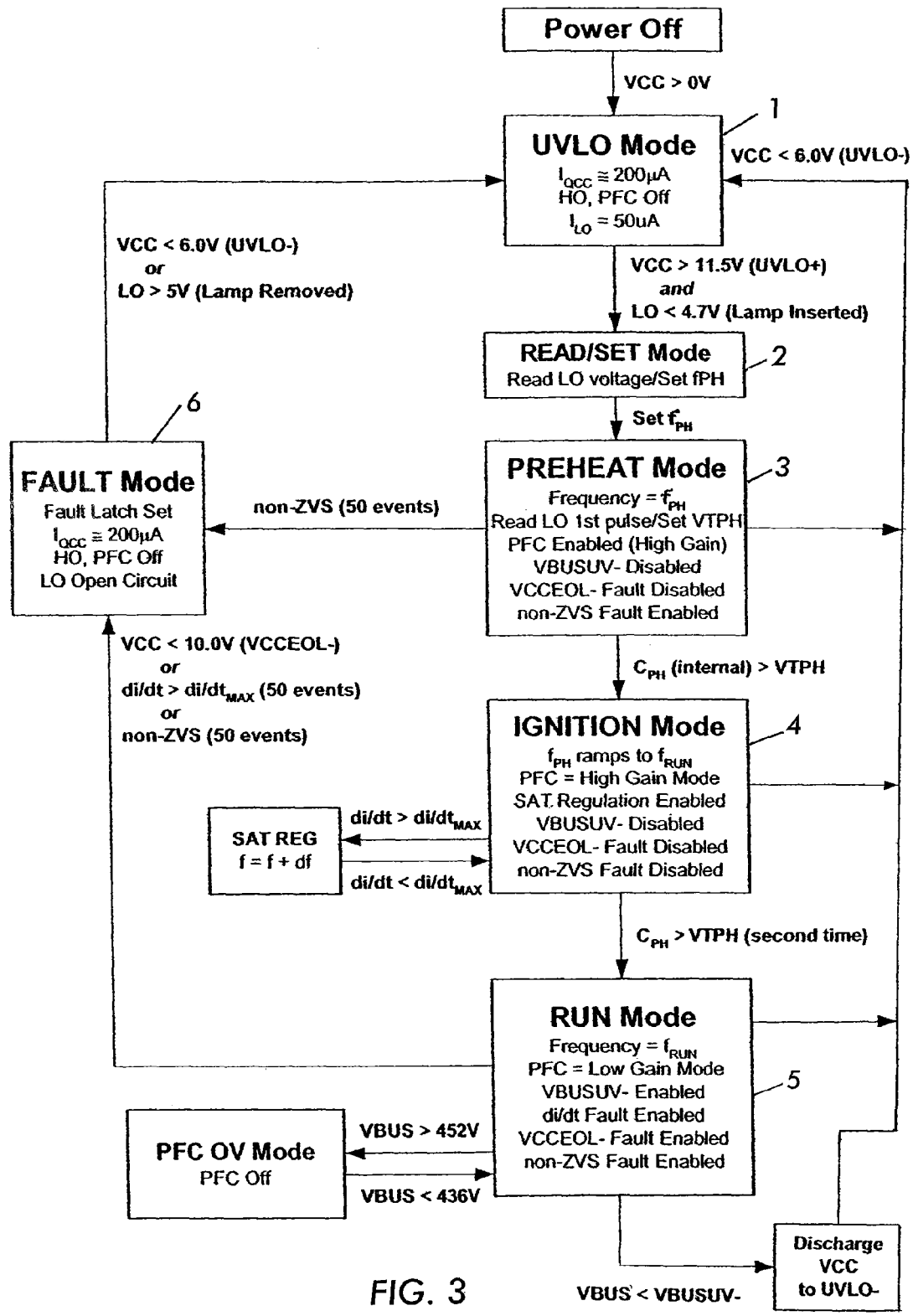
FIG. 3 is a state diagram showing sequences of operations in the IC.

The ballast control circuit 100 contains functions to properly control all types of fluorescent lamps. These functions include preheat frequency, preheat time, run frequency, ignition voltage regulation, lamp non-strike protection, lamp removal or open circuit protection, lamp replacement automatic restart, and lamp end-of-life protection. The modes or 'states' of the control circuit include:
  1) UVLO Mode
  2) Read/Set Mode
  3) Preheat Mode
  4) Ignition Mode
  5) Run Mode
  6) Fault Mode For a detailed flowchart between these states refer to the State Diagram in FIG. 3.

UVLO Mode (1)

Figure 2:
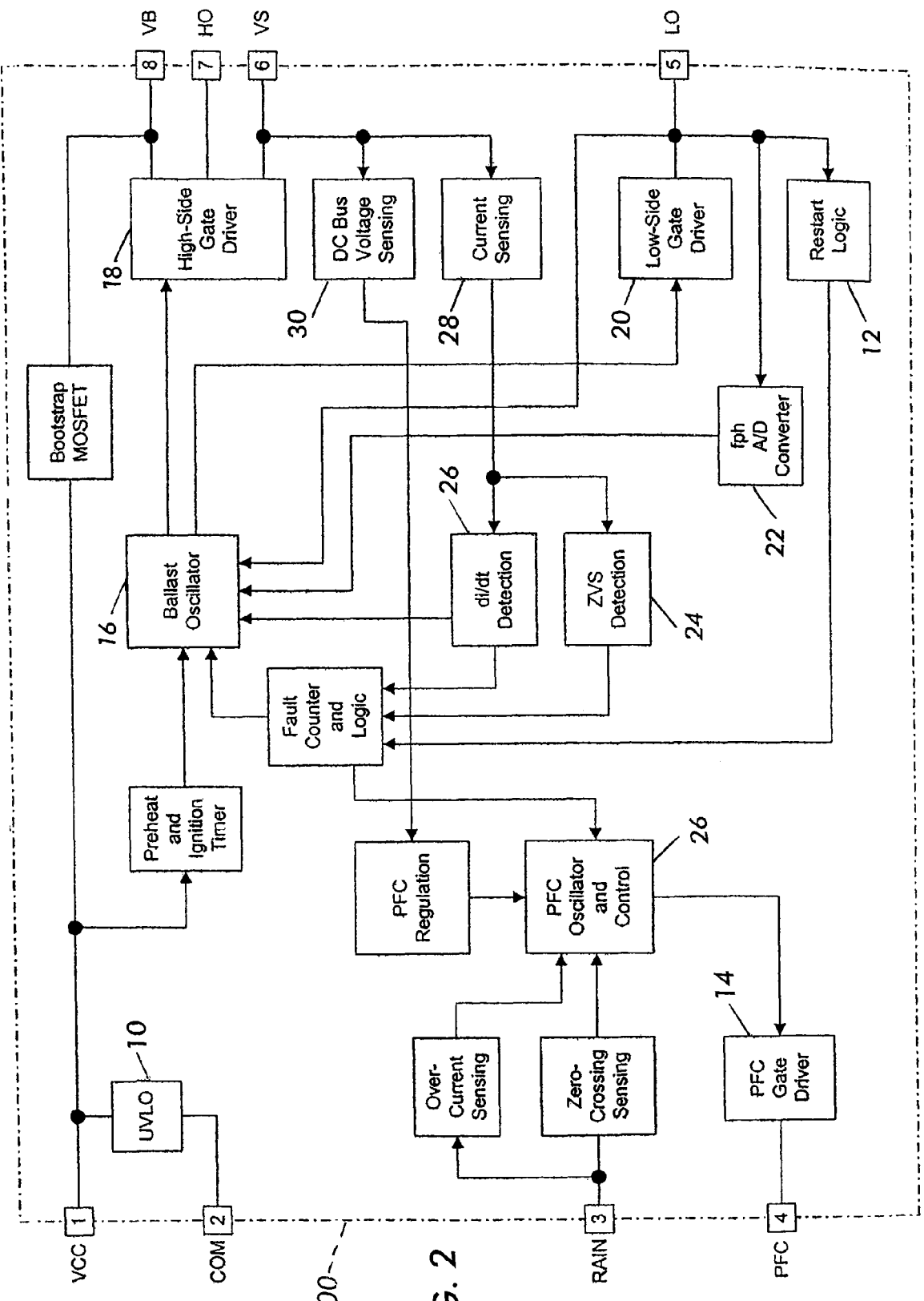
FIG. 2 is a block diagram of the IC.

Under-voltage Lock-out (UVLO) Mode is the state the circuit (see FIG. 2) is in when the supply voltage at VCC is below the correct turn-on threshold voltage. During UVLO Mode, both the PFC and ballast circuits are disabled with only a minimum number of required functions enabled. The enabled circuits include the UVLO circuit 10 itself, the restart logic circuit 12 and the preheat frequency read/set circuit 22. The complete PFC (PFC Regulation, PFC Oscillator and Control, Over-Current Sensing, Zero-Crossing Sensing, and PFC Gate Driver) circuit is disabled and the PFC gate driver 14 output is off (logic 'low') to ensure that the external PFC MOSFET MPFC is in a defined state and does not turn on unexpectedly. The ballast oscillator 16 is disabled and the high-side gate driver 18 output (HO pin) is off (logic 'low').

The low-side gate driver 20 output (LO pin) is used as an input pin during UVLO Mode for the restart logic circuit 12 and the preheat frequency read/set circuit 22. The use of the LO pin as an input pin during UVLO mode is a useful feature of this circuit. Traditional half-bridge driver circuits disable both LO and HO pins (both off, logic 'low') during UVLO mode to prevent the external half-bridge MOSFETs from turning on unexpectedly. If the upper MOSFET MHS of the totem-pole configuration is off then it does not matter if the lower MOSFET MLS is on or off because no voltage will be generated at the half-bridge mid-point. The LO pin is therefore available to use as an input during UVLO and Fault Modes. Using the LO pin as an automatic restart input to detect when the lamp has been removed and reinserted, and, as an input to program the preheat frequency, eliminates the need for additional pins to realize these functions. Using the LO pin as input during UVLO mode is one of the useful features of this circuit that allows for the entire PFC and ballast circuit to be realized in a simple 8-pin IC package.

Figure 1:
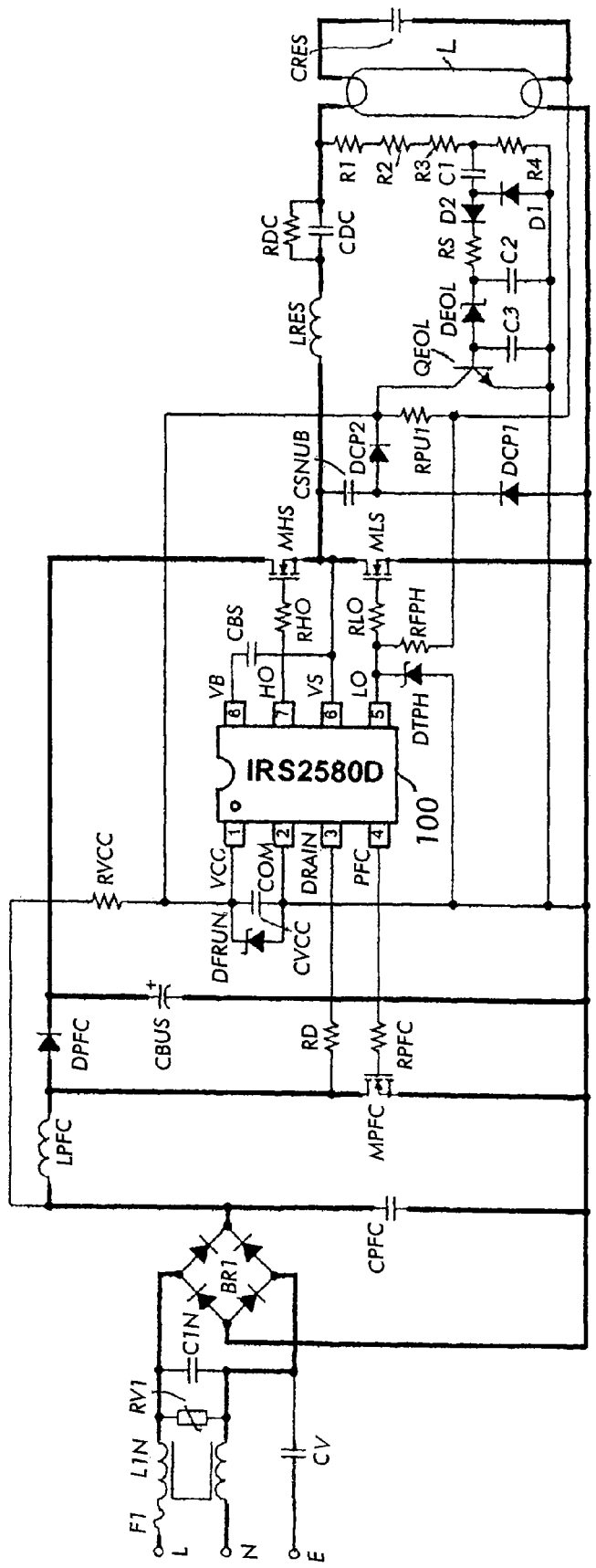
FIG. 1 is a schematic diagram showing a typical application of the IC.

During UVLO Mode, a current source is connected to the LO pin. This current flows through a resistor (RFPH) that is connected between the LO pin and COM. The resulting voltage at the LO pin is measured by the read/set circuit 22 and is used to set the preheat frequency of the ballast oscillator 16. The restart circuit 12 also measures the LO pin voltage during UVLO Mode to detect if a lamp is inserted in the lamp resonant output stage. If a lamp is not inserted, the resistor RFPH will pull-up to VCC and pull the LO pin above the restart threshold voltage (10V typical) and prevent the IC from exiting UVLO mode. If the lamp is inserted, resistor RFPH will be connected through the lower lamp filament to COM (see FIG. 1, Typical Application Schematic Diagram) and will pull the voltage on the LO pin below the restart threshold voltage. If the LO pin voltage is below the restart threshold and the VCC supply voltage is above the UVLO+ turn-on threshold, then the IC will exit UVLO Mode and enter Read/Set Mode. During UVLO Mode, the circuit draws only a small amount of 'micro-power' current (200 uA typical). This micro-power current, together with the resistor RVCC connected between VCC and the AC mains rectified input voltage and the UVLO+ threshold, sets the AC mains turn-on voltage for the complete electronic ballast.

Read/Set Mode (2)

During UVLO Mode the circuit outputs a source current at the LO pin. An external resistor RFPH is connected between the LO pin and COM. This current flows through resistor RFPH resulting in a voltage level at the LO pin. As soon as VCC exceeds the UVLO+ threshold, the circuit enters Read/Set Mode and the read/set circuit measures the voltage at the LO pin and sets the corresponding preheat frequency. This is accomplished using several comparators that measure the voltage at the LO pin during Read/Set Mode and compares it against several pre-determined voltage levels. The voltage range that the LO pin voltage falls into determines which comparator outputs will go 'high' or 'low', and these 'high' and 'low' logic signals are used to set the appropriate latch circuit to set the correct oscillator 16 frequency during preheat. The number of comparators determines the amount of programming resolution. 32 comparators, for example, will give a resolution of 32 levels of preheat frequency programmability. As soon as the preheat frequency has been set, the ballast control circuit 100 then exits Read/Set Mode and enters Preheat Mode.

Preheat Mode (3)

The circuit enters Preheat Mode when VCC exceeds the UVLO+ threshold voltage and the preheat frequency has been set. The PFC circuit becomes active and the PFC pin oscillates at the correct on and off time for high power factor and regulation of the DC bus voltage to a constant level. The ballast oscillator 16 becomes active and the LO gate driver output turns on first. During the first on-time pulse of LO, the LO pin sources a gate drive current (300 mA typical) to turn on the external low-side half-bridge MOSFET MLS. The voltage level at the LO pin becomes limited by the zener diode, DTPH, that is connected between the LO pin and COM. The preheat time read/set circuit measures the voltage at the LO pin during the first LO on-time pulse and sets the corresponding ballast preheat time. Similar to the preheat frequency read/set circuit 22, this is accomplished using several comparators and voltage levels and the number of comparators determines the amount of programming resolution.

The minimum zener voltage of the zener diode DTPH connected to the LO pin should be higher than the VCC UVLO+ threshold in order to allow for the circuit to exit UVLO Mode.

After the preheat time is set, HO and LO begin oscillating normally at an initial soft-start frequency that is a fixed percentage higher than the preheat frequency. HO and LO oscillate on and off at a 50% duty-cycle and with a non-overlapping dead-time (1.5 usec typical) between LO-to-HO and HO-to-LO switching transitions. The frequency quickly ramps down to the set preheat frequency and remains at the preheat frequency for the duration of the preheat time.

The preheat time was set during the initial on-time pulse at the LO pin at the start of preheat with the zener diode, DTPH, connected between LO and COM. This caused a corresponding internal voltage level (VTPH) to be set that is compared against an internal ramping capacitor, CPH. The internal capacitor, CPH, is ramped up with small pulses (100 nsec typical) that occur once each cycle of the ballast oscillator 16. This causes the voltage on capacitor CPH to charge up in a 'stair-step' fashion. By controlling CPH in this stair-step manner, a very small capacitor can be used for CPH. Also, since the oscillator 16 during Preheat Mode determines the frequency of the 'stair-step' pulses on CPH, the preheat time is therefore dependent on the preheat frequency and the external zener diode at the LO pin. When the internal capacitor voltage exceeds the set preheat time voltage level (VTPH), the ballast control circuit exits Preheat Mode and enters Ignition Mode.

During Preheat Mode, the non-ZVS protection circuit 24 is also active and detects if hard-switching occurs at the half-bridge mid-point. Should non-ZVS occur due to lamp removal, filament failure or open circuit, the circuit will enter Fault Mode after for example 50 events of non-ZVS have occurred. The non-ZVS circuit detects hard-switching using an additional high-voltage sensing MOSFET that is connected to the mid-point of the half-bridge. This MOSFET is turned on at the turn-off of HO (start of the dead-time) and the voltage at the VS pin is measured at the turn-on of LO (end of the dead-time). If the voltage is non-zero then this is determined to be a non-ZVS fault occurrence.

Ignition Mode (4)

The circuit enters Ignition Mode when the internal preheat timing capacitor, CPH, exceeds the set preheat time voltage level (VTPH) for the first time. CPH is then discharged quickly to COM and then begins charging up again in the same 'stair-step' fashion as during Preheat Mode. During this second charge time, the ballast oscillator 16 frequency begins ramping the frequency down at a pre-determined rate from the preheat frequency to the final run frequency. This will cause the voltage across the fluorescent lamp L to increase as the frequency decreases towards the resonance frequency of the resonant lamp output stage. When the lamp voltage reaches the required lamp ignition voltage, the lamp will ignite. The frequency will continue to ramp down until it reaches the final running frequency.

If the lamp does not ignite, the lamp voltage and inductor tank current (see current sensing circuit 28) will continue to increase until the inductor saturates. When saturation occurs, the di/dt circuit 26 will detect the sharp increase in the slope of the inductor current and then increase the frequency by a pre-determined amount to decrease on-time of LO and HO. The decrease in the on-time of LO and HO will cause the corresponding external MOSFET MHS, MLS to turn-off earlier each cycle. This will decrease the peak current that the inductor charges up to so that it is just below the saturation level. The frequency will remain at this level to keep the inductor current just below saturation for the duration of the Ignition Mode time.

Regulating the inductor current just below the saturation level results in an adaptive ignition regulation control circuit. This circuit will regulate the maximum inductor current just below the saturation level regardless of temperature and/or the size or type of the inductor used, and eliminates the need for a precise current sensing resistor typically used with traditional ballast control methods. Regulating the current just below the saturation level will also cause the voltage across the lamp to be regulated to a constant level for the duration of the ignition time. This ignition regulation feature significantly increases the reliability of igniting the lamp. This is especially useful at low temperatures or when igniting old lamps and can therefore increase the lifetime of the lamp by allowing for a higher number of ignitions to occur before the lamp is replaced.

The inductor current is sensed using a high-voltage sensing MOSFET that is connected to the mid-point of the half-bridge circuit (VS pin). During NS the time when HO is on, the mid-point of the half-bridge is up at the DC bus voltage and the high-voltage sensing MOSFET is turned off and is blocking the high-voltage. During the time when LO is on, the high-voltage MOSFET is turned on for measuring the voltage across the RDSon of the external lower half-bridge MOSFET MLS. Because this circuit detects di/dt, it is therefore independent of the RDSon value, which is different from MOSFET to MOSFET and changes with temperature.

When the internal CPH capacitor ramps up to the set preheat time voltage level (VTPH) a second time, the circuit exits Ignition Mode and enters Run Mode.

Run Mode (5)

After Preheat Mode and when the internal CPH capacitor ramps up to VTPH a second time, this signals the end of Ignition Mode and the circuit enters Run Mode.

Figure 4:
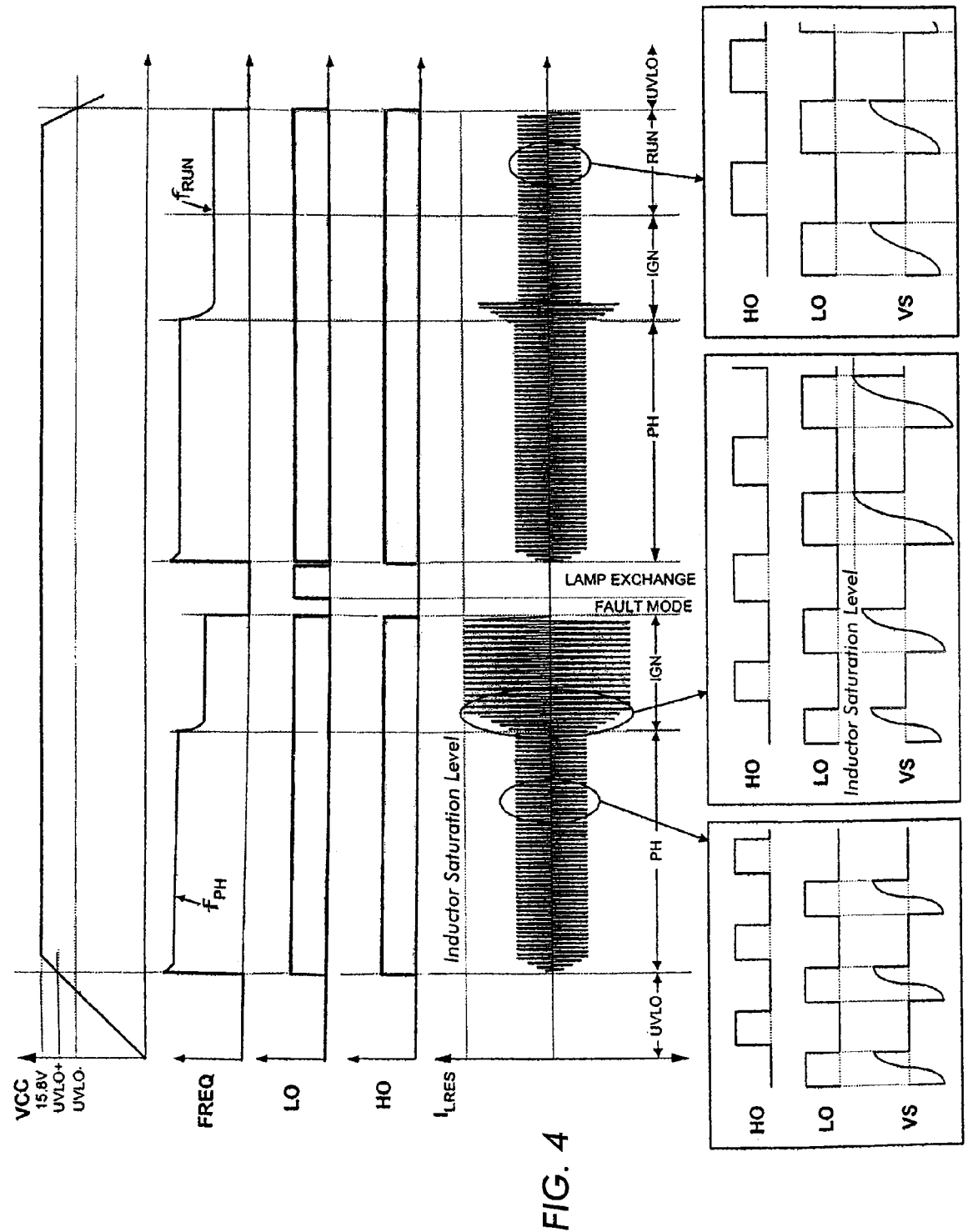
FIG. 4 is a timing diagram showing signals in the IC.

If the lamp L ignited successfully during Ignition Mode then the frequency will continue to ramp down to the final running frequency. This run frequency is programmed with a zener diode, DFRUN, connected between VCC and COM. The resulting voltage level set on VCC with the zener diode, DFRUN, sets the ramping threshold for a timing capacitor, CT. This timing capacitor is charged up linearly to VCC with a current source each switching cycle of LO and HO. The time it takes for CT to charge up from COM to VCC, minus a small fixed dead-time delay (1.5usec typical), determines the on-time of LO and HO. When CT reaches VCC, CT is discharged to COM instantly and the ramp charges again. The result is a 'saw-tooth' voltage waveform on CT, and each on-time ramp is toggled alternately between LO and HO gate driver outputs (see FIG. 4, ballast oscillator timing diagram).

During Run Mode, the ignition regulation circuit is disabled and the circuit will enter Fault Mode if several events (50 events typical) of a di/dt greater than a maximum di/dt occur.

If the lamp did not ignite during Ignition Mode, the di/dt circuit will have regulated the inductor current just below saturation by holding the frequency at a constant level for the duration of Ignition Mode. Since the ignition regulation circuit becomes disabled in Run Mode, the frequency will start to decrease again towards the final run frequency. This will cause the inductor to saturate again and will be detected by the di/dt circuit 26. After several events (50 typical) of saturation are detected by the di/dt circuit 26, the ballast circuit will enter Fault Mode and shutdown the circuit safely before the high-current and high-voltage can damage circuit components or harm someone performing maintenance on the lamp.

If the lamp ignited successfully during Ignition Mode, the frequency will have already ramped down to the final run frequency by the time the circuit enters Run Mode.

During Run Mode, the DC bus under-voltage protection circuit is enabled. If the DC bus drops below an unsafe level, the circuit will detect this and discharge VCC below UVLO- to turn the ballast circuit off safely. The end-of-life (EOL) negative-going latched threshold (VCCEOL-) is also enabled at the VCC pin. Should end-of-life occur on the lamp, an asymmetrical shift in the lamp voltage can occur. This shift will be detected by an external circuit including QEOL and will pull VCC below VCCEOL- (10V typical). When VCC decreases below VCCEOL- during Run Mode, the circuit will latch off safely.

Traditional solutions use only 'on' and 'off' UVLO thresholds on VCC that are non-latched but have hysteresis between them. Another pin is then used to sense an end-of-life condition on the lamp and latch off the circuit should a fault occur. By adding a third threshold at VCC that is latched, which is in between the UVLO+ and UVLO- thresholds, and is only enabled in Run Mode, the end-of-life protection can be realized at the VCC pin and an additional pin for end-of-life can be eliminated.

If an end-of-life condition occurs during Run Mode and VCC is pulled down to VCCEOL- by QEOL in the external end-of-life detection circuit, the ballast circuit will enter Fault Mode and latch off safely and only draw micro-power current at VCC. The external supply resistor, RVCC, will pull VCC up to the external zener diode voltage (DFRUN) and the circuit will remain in Fault Mode. If the voltage at the LO pin pulls up above the restart threshold (VRESTART+) due to a lamp removal, or, VCC is decreased below the lower UVLO- threshold (6V typical), then the latch will be reset and the complete circuit will enter UVLO Mode.

When the voltage at the LO pin is below the VRESTART- threshold (lamp is re-inserted) and VCC is greater than the UVLO+ threshold (11.5V typical), then the circuit will enter Read/Set Mode and continue through the state diagram to preheat, ignite and run the lamp again as normal.

During Run Mode, the non-zero-voltage switching (non-ZVS) protection 24 is also enabled. Should a non-ZVS condition occur during Run Mode due to a lamp removal fault or an open filament fault, then, similar to Preheat Mode, the non-ZVS protection circuit will detect the resulting hard-switching at the half-bridge mid-point (VS pin). After several events (50 typical) of hard-switching, the ballast circuit will enter Fault Mode and latch the ballast circuit off safely.

Fault Mode (6)

The ballast circuit will enter Fault Mode from Preheat Mode if several events of non-ZVS occur. The ballast circuit will enter Fault Mode from Run Mode if several events of non-ZVS or di/dt occur, or, VCC is less than VCCEOL-. When the circuit is in Fault Mode, the ballast 16 and PFC 26 oscillators are latched off and gate driver outputs HO and PFC are both turned 'off' (logic 'low'). The circuit remains in this latched state while consuming only micro-power current (200 uA typical) at VCC. The LO gate driver output goes open circuit and becomes an input for detecting if the lamp is exchanged. If the LO pin is pulled above VRESTART+ (lamp removal), or, VCC is decreased below UVLO-(AC mains voltage is turned off or interrupted), the fault latch will be reset and the ballast circuit will exit Fault Mode and enter UVLO Mode.

Advantages

1) Complete fluorescent PFC+ ballast control circuit in only 8-pins.

2) Using low-side gate driver output (LO pin) also as an input pin during the time when the half-bridge is disabled (UVLO or Fault Modes). This is possible in a half-bridge configuration when the high-side gate drive output (HO pin) is off (logic 'low'). If HO is off, then LO can be on or off. Holding HO off during this time will prevent shoot-through from occurring through the half-bridge.

3) Using low-side gate driver output (LO pin) as an input pin during the time when the half-bridge is disabled to detect if the lamp is correctly inserted into the output stage.

4) Using low-side gate driver output (LO pin) as an input pin during the time when the half-bridge is disabled to measure a voltage level on the pin for programming a desired ballast parameter (preheat frequency, for example). An internal current source connected to an external resistor sets the voltage level.

5) Reading the low-side gate driver output (LO pin) voltage level during the on-time pulse for programming a desired ballast parameter (preheat time, for example). A zener diode is used to program the voltage amplitude during the on-time pulse.

6) Using the voltage level on VCC to program a desired ballast parameter (running frequency, for example). A zener diode is used to program the voltage amplitude on VCC.

7) Detecting inductor saturation and adjusting the on-time of LO and/or HO gate driver outputs to regulate the inductor current just below the saturation point. A measurement of the slope of the current (di/dt) is used to detect inductor saturation. A change in the slope of the inductor current will signal inductor saturation and can be used to decrease the on-time to decrease the peak current back below the saturation level. Dynamically detecting saturation and regulating just below the saturation level will maintain a safe ignition voltage across the lamp independent of inductor tolerances and temperature.

8) Measuring the DC bus voltage level through the half-bridge mid-point (VS pin) during the time when the high-side MOSFET is on. An internal voltage divider is connected between the VS pin and COM. When the high-side half-bridge MOSFET is on (HO is on, logic 'high'), the VS pin will be connected to the DC bus (through the high-side MOSFET) and the voltage divider will give a ratio measurement (100:1 typical) of the DC bus. This measurement can be used by the PFC circuit to regulate the DC bus to a constant level without the need for an additional pin or external voltage divider.

9) Measuring the current in the low-side half-bridge MOSFET through the half-bridge mid-point (VS pin) during the time when the low-side MOSFET is on. An internal high-voltage MOSFET is turned on during the time when the low-side MOSFET is on for measuring the voltage level at the drain of the low-side MOSFET resulting from the load current flowing through the on-resistance (RDSon) of the low-side MOSFET. The internal high-voltage MOSFET is turned off during all other times to block the high-voltage from damaging the low-side sensing circuitry. This current measurement can be used for di/dt sensing during inductor saturation or for general purpose over-current protection.

10) Measuring the voltage at the half-bridge mid-point (VS pin) to detect the occurrence of zero-voltage switching. An internal high-voltage MOSFET is turned on when HO is turned off. A measurement is taken after the dead-time delay and at the turn on of LO to determine if the voltage at the mid-point has slewed to COM before turning the low-side switch on. If the voltage is above zero, then this is seen as a non-ZVS fault condition and the circuit can be disabled.

11) Using non-ZVS to detect a lamp removal, one or more open filaments, open circuit, or wrong lamp fault condition. If these fault conditions occur, then the half-bridge will work in a non-ZVS condition (hard-switching). The non-ZVS detection circuit detects this condition and disables the ballast.

12) Using a fault counter to detect the number of events of the occurrence of a fault before disabling the ballast circuit. Using a fault counter makes the circuit more immune to asynchronous noise that can occur due to various reasons such as voltage spikes at the AC mains input of the ballast. Without a fault counter, this noise can cause the ballast to shutdown mistakenly.

13) Including an additional latched threshold on VCC that is in between the UVLO+/− thresholds to allow the ballast to be latched off using an external circuit. In this implementation, this latched threshold is enabled only during Run Mode and is used to detect lamp end-of-life (EOL).

14) A new PFC compensation circuit.

15) A new PFC zero-crossing detection circuit.

16) A new PFC over-current sensing circuit.

Although the present invention has been described in relation to particular embodiments thereof, many other variations and modifications and other uses will become apparent to those skilled in the art. Therefore, the present invention is not limited by the specific disclosure herein.

What is claimed is:

1. An integrated circuit (IC) for controlling a power circuit for delivery of power to a load circuit including a fluorescent lamp, the IC comprising:
   a ballast control and drive circuitry configured to drive signals to the power circuit, configured to receive current and voltage sense signals from said power circuit, and configured to respond to the current and voltage sense signals by modifying said drive signals;
   said IC configured to provide power factor correction to said load circuit;
   said IC configured to detect when said fluorescent lamp has not ignited.

2. The IC of claim 1, wherein said drive circuitry has a low-side gate driver output pin which is used as an input pin during a time when the power circuit is disabled.

3. The IC of claim 2, wherein said power circuit is disabled during a UVLO mode or a fault mode of said IC.

4. The IC of claim 2, wherein said low-side gate driver output pin is used as an input pin during the time when the power circuit is disabled to detect if the lamp is correctly inserted into the output stage.

5. The IC of claim 2, wherein said low-side gate driver output pin is used as an input pin during the time when the power circuit is disabled to measure a voltage level on the pin for programming a desired ballast parameter.

6. The IC of claim 5, wherein said pin is used to program preheat frequency.

7. The IC of claim 5, wherein an internal current source connected to an external resistor sets the voltage level on said pin.

8. The IC of claim 2, wherein said low-side gate driver output pin voltage level is set during an on-time pulse for programming a desired ballast parameter.

9. The IC of claim 8, wherein said voltage level is used to set preheat time.

10. The IC of claim 8, further comprising a zener diode used to program said voltage level during the on-time pulse.

11. The IC of claim 1, wherein a voltage level on a VCC pin of said IC is used to program a desired ballast parameter.

12. The IC of claim 11, wherein said VCC pin voltage level is used to program running frequency.

13. The IC of claim 11, further comprising a zener diode used to program the voltage amplitude on the VCC pin.

14. A method for use by an integrated circuit (IC) for controlling a power circuit for delivery of power to a load circuit including a fluorescent lamp, the method comprising:
providing drive signals to the power circuit using a ballast control and drive circuitry,
receiving current and voltage sense signals from said power circuit using ballast control and drive circuitry;
responding to the current and voltage sense signals by modifying said drive signals using the ballast control and drive circuitry;
said method adaptable to provide power factor correction of said load circuit;
said method adaptable to detect when said fluorescent lamp has not ignited.

15. The method of claim 14, wherein said drive circuitry has a low-side gate driver output pin which is used as an input pin during a time when the power circuit is disabled.

16. The method of claim 15, wherein said power circuit is disabled during a UVLO mode or a fault mode of said IC.

17. The method of claim 15, wherein said low-side gate driver output pin is used as an input pin during the time when the power circuit is disabled to detect if the lamp is correctly inserted into the output stage.

18. The method of claim 15, wherein said low-side gate driver output pin is used as an input pin during the time when the power circuit is disabled to measure a voltage level on the pin for programming a desired ballast parameter.

19. The method of claim 18, wherein said pin is used to program preheat frequency.

20. The method of claim 18, wherein an internal current source connected to an external resistor sets the voltage level on said pin.

21. The method of claim 15, wherein said low-side gate driver output pin voltage level is set during an on-time pulse for programming a desired ballast parameter.

22. The method of claim 21, wherein said voltage level is used to set preheat time.

23. The method of claim 21, wherein a zener diode is used to program said voltage level during the on-time pulse.

24. The method of claim 14, wherein a voltage level on a VCC pin of said IC is used to program a desired ballast parameter.

25. The method of claim 24, wherein said VCC pin voltage level is used to program running frequency.

26. The method of claim 24, wherein a zener diode is used to program the voltage amplitude on the VCC pin.

* * * * *